United States Patent
Lynch et al.

(10) Patent No.: US 9,657,512 B2
(45) Date of Patent: *May 23, 2017

(54) REVERSE MOLDED PLANT-ON PANEL COMPONENT, METHOD OF MANUFACTURE, AND METHOD OF DECORATING A DOOR THEREWITH

(71) Applicant: Masonite Corporation, Tampa, FL (US)

(72) Inventors: Steven K. Lynch, North Aurora, IL (US); Dale E. Schafernak, Palatine, IL (US); Karine Luetgert, Geneva, IL (US); Bei-Hong Liang, Naperville, IL (US); Lee Braddock, Huntley, IL (US)

(73) Assignee: Masonite Corporation, Tampa, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 15/070,755

(22) Filed: Mar. 15, 2016

(65) Prior Publication Data
US 2016/0265266 A1 Sep. 15, 2016

Related U.S. Application Data

(60) Continuation of application No. 14/043,304, filed on Oct. 1, 2013, now Pat. No. 9,284,772, which is a
(Continued)

(51) Int. Cl.
*E06B 3/70* (2006.01)
*B44C 5/04* (2006.01)
(Continued)

(52) U.S. Cl.
CPC .............. *E06B 3/7001* (2013.01); *B27N 3/08* (2013.01); *B27N 3/20* (2013.01); *B44C 1/00* (2013.01);
(Continued)

(58) Field of Classification Search
CPC ........... E06B 3/7001; B27N 3/08; B27N 3/20; B29K 2311/14; B44C 1/00; B44C 5/043;
(Continued)

(56) References Cited

U.S. PATENT DOCUMENTS

| 1,867,575 A | 7/1932 | Loetscher |
| 2,007,025 A | 7/1935 | Rieser |

(Continued)

FOREIGN PATENT DOCUMENTS

| DE | 1092183 B | 11/1960 |
| DE | 1210551 B | 2/1966 |

(Continued)

OTHER PUBLICATIONS

Panel Fast: Premium Timber Products, Ltd. product. Photos and advertising of "Panel Fast" product offered for sale in United Kingdom as a wainscot treatment, possibly by Jeldwen.

*Primary Examiner* — Robert J Grun
(74) *Attorney, Agent, or Firm* — Berenato & White, LLC

(57) ABSTRACT

A reverse molded, plant-on decorative panel component comprises a panel portion lying on a first plane, a skirt portion, and a contoured portion. The skirt portion has a first surface adapted to be exteriorly disposed and an opposite second surface adapted to be interiorly disposed in order to be adhesively secured to a planar surface. The contoured portion extends outwardly from and surrounds the panel portion and interconnects and is integral with the panel portion and the skirt portion. The skirt portion extends peripherally about the contoured portion.

20 Claims, 9 Drawing Sheets

Related U.S. Application Data continuation of application No. 12/952,297, filed on Nov. 23, 2010, now Pat. No. 8,545,968, which is a continuation of application No. 11/392,606, filed on Mar. 30, 2006, now Pat. No. 7,837,922, which is a division of application No. 10/400,443, filed on Mar. 28, 2003, now Pat. No. 7,021,015, which is a continuation-in-part of application No. 09/761,394, filed on Jan. 16, 2001, now Pat. No. 6,588,162, which is a continuation-in-part of application No. 09/742,840, filed on Dec. 21, 2000, now abandoned.

(60) Provisional application No. 60/198,709, filed on Apr. 20, 2000.

(51) Int. Cl.

| | | |
|---|---|---|
| *B27N 3/20* | (2006.01) | |
| *B27N 3/08* | (2006.01) | |
| *B44C 1/00* | (2006.01) | |
| *B44C 3/04* | (2006.01) | |
| *B44C 5/00* | (2006.01) | |
| *B44F 9/02* | (2006.01) | |
| *E04F 13/08* | (2006.01) | |
| *E04F 13/18* | (2006.01) | |
| *E06B 7/00* | (2006.01) | |
| *B29K 311/14* | (2006.01) | |

(52) U.S. Cl.
CPC ............. *B44C 3/046* (2013.01); *B44C 5/00* (2013.01); *B44C 5/043* (2013.01); *B44C 5/0453* (2013.01); *B44C 5/0461* (2013.01); *B44F 9/02* (2013.01); *E04F 13/0871* (2013.01); *E04F 13/18* (2013.01); *E06B 7/00* (2013.01); *B29K 2311/14* (2013.01); *Y10T 428/24628* (2015.01); *Y10T 428/24736* (2015.01); *Y10T 428/24769* (2015.01)

(58) Field of Classification Search
CPC ....... B44C 5/0453; B44C 5/0461; B44F 9/02; Y10T 428/24628; Y10T 428/24736; Y10T 428/24769
See application file for complete search history.

(56) References Cited

U.S. PATENT DOCUMENTS

| | | |
|---|---|---|
| 3,085,927 A | 4/1963 | Pesch |
| 3,402,520 A | 9/1968 | Lee et al. |
| 3,634,986 A | 1/1972 | Ford et al. |
| 3,954,376 A | 5/1976 | Munk |
| 4,061,813 A | 12/1977 | Geimer et al. |
| 4,073,851 A | 2/1978 | Munk |
| 4,159,302 A | 6/1979 | Greve et al. |
| 4,236,365 A | 12/1980 | Wheeler |
| 4,265,067 A | 5/1981 | Palmer |
| 4,378,265 A | 3/1983 | Kiss |
| 4,381,328 A | 4/1983 | Bunner et al. |
| 4,469,655 A | 9/1984 | Kiss |
| 4,550,540 A | 11/1985 | Thorn |
| 4,552,797 A | 11/1985 | Munk et al. |
| 4,610,900 A | 9/1986 | Nishibori |
| 4,612,224 A | 9/1986 | Davis |
| 4,622,190 A | 11/1986 | Schultz |
| 4,656,722 A | 4/1987 | Armstrong |
| 4,726,881 A | 2/1988 | Schultz |
| 4,734,236 A | 3/1988 | Davis |
| 4,812,188 A | 3/1989 | Hansen |
| 4,844,968 A | 7/1989 | Persson et al. |
| 4,865,788 A | 9/1989 | Davis |
| 4,960,548 A | 10/1990 | Ikeda et al. |
| 4,960,553 A | 10/1990 | DeBruine et al. |
| 4,969,302 A | 11/1990 | Coggan et al. |
| 5,016,414 A | 5/1991 | Wang |
| 5,028,374 A | 7/1991 | Imao et al. |
| 5,074,087 A | 12/1991 | Green |
| 5,075,059 A | 12/1991 | Green |
| 5,090,173 A | 2/1992 | Coggan et al. |
| 5,142,835 A | 9/1992 | Mrocca |
| 5,154,968 A | 10/1992 | DePetris et al. |
| 5,175,970 A | 1/1993 | Green |
| 5,397,406 A | 3/1995 | Vaders et al. |
| 5,443,891 A | 8/1995 | Bach |
| 5,470,631 A | 11/1995 | Lindquist et al. |
| 5,525,394 A | 6/1996 | Clarke et al. |
| 5,534,352 A | 7/1996 | Pittman et al. |
| 5,543,234 A | 8/1996 | Lynch et al. |
| 5,598,667 A | 2/1997 | Dykes |
| 5,614,231 A | 3/1997 | Rinker |
| 5,614,285 A | 3/1997 | Gardill |
| 5,647,934 A | 7/1997 | Vaders et al. |
| D382,350 S | 8/1997 | Lynch |
| 5,674,934 A | 10/1997 | Schmidt et al. |
| 5,718,786 A | 2/1998 | Lindquist et al. |
| 5,766,774 A | 6/1998 | Lynch et al. |
| 5,782,055 A | 7/1998 | Crittenden |
| 5,851,325 A | 12/1998 | Terada et al. |
| 5,854,149 A | 12/1998 | Nagayama et al. |
| 5,887,402 A | 3/1999 | Ruggie et al. |
| 6,092,343 A | 7/2000 | West et al. |
| 6,103,167 A | 8/2000 | Mukai et al. |
| 6,161,363 A | 12/2000 | Herbst |
| 6,189,276 B1 | 2/2001 | Pinto et al. |
| 6,200,687 B1 | 3/2001 | Smith et al. |
| 6,226,958 B1 | 5/2001 | West et al. |
| 6,287,678 B1 | 9/2001 | Spengler |
| 6,312,540 B1 | 11/2001 | Moyes |
| 6,364,982 B1 | 4/2002 | Lynch et al. |
| 6,389,768 B1 | 5/2002 | Gagne et al. |
| 6,397,541 B1 | 6/2002 | Brewer |
| 6,468,381 B1 | 10/2002 | Morgan |
| 6,485,800 B1 | 11/2002 | Liittschwager |
| 6,511,567 B1 | 1/2003 | Ruggie et al. |
| 6,565,795 B1 | 5/2003 | Hanada et al. |
| 6,584,743 B2 | 7/2003 | Paxton et al. |
| 6,588,162 B2 | 7/2003 | Lynch et al. |
| 6,602,610 B2 | 8/2003 | Smith et al. |
| 6,764,625 B2 | 7/2004 | Walsh et al. |
| D495,061 S | 8/2004 | Lynch et al. |
| 6,773,791 B1 | 8/2004 | Ruggie et al. |
| D507,835 S | 7/2005 | Lynch et al. |
| D516,225 S | 2/2006 | Lynch et al. |
| D516,226 S | 2/2006 | Lynch et al. |
| 7,021,015 B2 | 4/2006 | Lynch et al. |
| D528,670 S | 9/2006 | Davina et al. |
| D529,624 S | 10/2006 | Lynch et al. |
| 7,137,232 B2 | 11/2006 | Lynch et al. |
| 7,426,806 B2 | 9/2008 | Lynch et al. |
| 7,721,499 B2 | 5/2010 | Lynch et al. |
| 7,730,686 B2 | 6/2010 | Lynch et al. |
| 8,820,017 B2 | 9/2014 | Lynch et al. |
| 9,217,275 B2 * | 12/2015 | Lynch ............... B27N 3/08 |
| 9,284,772 B2 * | 3/2016 | Lynch ............... B27N 3/08 |
| 9,296,123 B2 * | 3/2016 | Liang ............... B27N 5/00 |
| 2001/0029714 A1 | 10/2001 | Lynch et al. |
| 2001/0030016 A1 | 10/2001 | Lynch et al. |
| 2002/0108337 A1 | 8/2002 | Clarke et al. |
| 2002/0174615 A1 | 11/2002 | Bell |
| 2003/0196396 A1 | 10/2003 | Lynch et al. |
| 2004/0035085 A1 | 2/2004 | Crittenden |
| 2004/0074186 A1 | 4/2004 | Lynch et al. |
| 2006/0185281 A1 | 8/2006 | Lynch et al. |

FOREIGN PATENT DOCUMENTS

| | | |
|---|---|---|
| DE | 1912300 A1 | 10/1969 |
| DE | 2142003 A1 | 3/1973 |
| DE | 2316250 A1 | 10/1974 |
| DE | 2339796 A1 | 3/1975 |
| DE | 2437131 A | 2/1976 |
| DE | 2537766 A1 | 3/1977 |

(56) References Cited

FOREIGN PATENT DOCUMENTS

| | | |
|---|---|---|
| DE | 2945843 A1 | 5/1981 |
| DE | 3045702 A1 | 7/1982 |
| DE | 3419824 A1 | 11/1985 |
| DE | 3712972 A1 | 10/1987 |
| DE | 4030586 A1 | 4/1991 |
| DE | 29603593 U1 | 4/1996 |
| DE | 69513400 T2 | 5/2000 |
| DE | 10134673 A1 | 4/2002 |
| DE | 69522506 T2 | 5/2002 |
| EP | 0225628 A2 | 6/1987 |
| EP | 0225629 A2 | 6/1987 |
| EP | 0246208 A1 | 11/1987 |
| EP | 0246208 B1 | 8/1990 |
| EP | 0635616 A1 | 1/1995 |
| EP | 0688639 A2 | 12/1995 |
| EP | 0770007 B1 | 11/1999 |
| EP | 1066936 A1 | 1/2001 |
| EP | 1190825 A2 | 3/2002 |
| FR | 1409105 A | 8/1965 |
| FR | 2144876 | 7/1972 |
| GB | 937710 A | 9/1963 |
| GB | 1066936 A | 4/1967 |
| GB | 1099528 A | 1/1968 |
| GB | 2024085 A | 1/1980 |
| GB | 2080721 A | 2/1982 |
| GB | 2237040 A | 4/1991 |
| GB | 2269558 A | 2/1994 |
| JP | 53-47623 B1 | 4/1978 |
| JP | 55-164142 A | 12/1980 |
| JP | 57-6745 A1 | 1/1982 |
| JP | 59-59433 A | 4/1984 |
| WO | 8702407 A1 | 4/1987 |
| WO | 9602395 A1 | 2/1996 |
| WO | 9962680 A1 | 12/1999 |
| WO | 0004249 A1 | 1/2000 |
| WO | 0067972 A1 | 11/2000 |
| WO | 0121369 A1 | 3/2001 |
| WO | 0138058 A2 | 5/2001 |
| WO | 0181055 A1 | 11/2001 |
| WO | 0224467 A1 | 3/2002 |
| WO | 02053334 A2 | 7/2002 |

\* cited by examiner

REVERSE MOLDED PLANT-ON PANEL COMPONENT, METHOD OF MANUFACTURE, AND METHOD OF DECORATING A DOOR THEREWITH

CLAIM TO PRIORITY AND CROSS-REFERENCE TO RELATED APPLICATIONS

The present application is a continuation of U.S. patent application Ser. No. 14/043,304, filed Oct. 1, 2013, now U.S. Pat. No. 9,284,772 which is a continuation of U.S. patent application Ser. No. 12/952,297, filed Nov. 23, 2010, now U.S. Pat. No. 8,545,968, which is a continuation of U.S. patent application Ser. No. 11/392,606, filed Mar. 30, 2006, now U.S. Pat. No. 7,837,922, which is a divisional application of U.S. patent application Ser. No. 10/400,443, filed Mar. 28, 2003, now U.S. Pat. No. 7,021,015, which is a continuation-in-part of U.S. patent application Ser. No. 09/761,394, filed Jan. 16, 2001, now U.S. Pat. No. 6,588,162, which is a continuation-in-part of U.S. patent application Ser. No. 09/742,840, filed Dec. 21, 2000, now abandoned, which is based on U.S. Provisional Patent Application Ser. No. 60/198,709 filed Apr. 20, 2000, the disclosures of all of which are incorporated herein by reference.

The present application is related to co-pending application Ser. No. 10/264,255, filed Oct. 4, 2002, titled Reverse Molded Panel, Method of Manufacture, and Door Manufactured Therefrom, which is a continuation-in-part of U.S. patent application Ser. No. 09/761,394, referenced above. The present application is also related to co-pending application Ser. No. 10/285,430, filed Nov. 1, 2002, titled Reverse Molded Panel, which is a continuation of U.S. patent application Ser. No. 09/761,394, referenced above.

FIELD OF THE INVENTION

The present invention is directed to a reverse molded, plant-on decorative panel component. The plant-on component comprises a panel portion lying on a first plane, a contoured portion, and a skirt portion. The plant-on component has a first surface adapted to be exteriorly disposed and an opposite second surface adapted to be interiorly disposed in order to be adhesively secured to a planar surface. The contoured portion extends outwardly from and surrounds the panel portion, and interconnects and is integral with the panel portion and the skirt portion. The skirt portion extends peripherally about the contoured portion, and may be disposed angularly relative to the first plane. The present invention is also directed to a method of decorating a planar surface, such as a door face, with the disclosed plant-on panel component.

BACKGROUND OF THE INVENTION

Man-made boards, such as fiberboard, e.g., hardboard; chipboard; oriented strand board-fiberboard composites; particle board; oriented strand board-particle board composites; and the like, may be formed into articles having contoured portions simulating stiles, rails, panels, or other desired features. Generally, such articles are formed from a planar cellulosic mat, and may include one or more interior depressions or raised contours simulating panels or other decorative features. For example, one method of manufacturing molded wood composite articles is disclosed in U.S. Pat. No. 5,543,234 to Lynch et al., the disclosure of which is incorporated herein by reference. Such molded articles commonly are embossed downwardly on their intended visible major outer surface in the manufacture of interior paneling, exterior siding, cabinet and furniture doors, and door skins, such that the exterior surfaces, such as stiles and rails, are the highest structure of the embossed product. The formed depressions and contoured portions may replicate a natural wood paneled door. Doors having such molded door skins are much less expensive compared to a natural wood door.

The prior art discloses that it is difficult to reverse mold and to emboss deep draws into a fiberboard panel due to stretching and breaking of the fibers. A reverse molded fiberboard is stretched more on its visible outer surface than on its interior surface (i.e. the surface in contact with a raised mold surface) making reverse molding much more difficult when attempting to provide sharp, crisp design detail in a raised panel that simulates natural wood millwork.

As disclosed in the following U.S. patents, reverse molding and embossing deep draws into a fiberboard panel generally requires one or more of multiple press steps, post mold curing at elevated temperatures, a foil or high resin content outer surface portion, and/or high binder resin content of about 5-25%, preferably at least 10% by weight of the product: U.S. Pat. No. 4,061,813 Geimer; U.S. Pat. No. 4,378,265 Kiss; U.S. Pat. No. 4,552,797 Munk; U.S. Pat. No. 4,610,900 Nishibori; U.S. Pat. No. 4,612,224 Davis; U.S. Pat. No. 4,622,190 Schultz; U.S. Pat. No. 4,726,881 Schultz; U.S. Pat. No. 4,734,236 Davis; U.S. Pat. No. 4,812,188 Hansen; U.S. Pat. No. 4,844,968 Persson; U.S. Pat. No. 4,865,788 Davis; U.S. Pat. No. 4,960,548 Ikeda; U.S. Pat. No. 4,960,553 DeBruine; U.S. Pat. No. 4,969,302 Coggan; U.S. Pat. No. 5,028,374 Imao; U.S. Pat. No. 5,090,173 Coggan; U.S. Pat. No. 5,154,968 DePetris; U.S. Pat. No. 5,443,891 Bach; U.S. Pat. No. 5,851,325 Terada; and U.S. Pat. No. 5,887,402 Ruggie.

The cellulosic fibers used to form the loose mat, e.g. a 1 inch to 2 inch, preferably a 1½ or 1¾ inch, thick layer of cellulosic fibers having a specific gravity of, for example, 0.6, initially may be bone dry after the fibers have been dried and felted, but the cellulosic fibers in such mats absorb moisture from the atmosphere and generally include about 2% to about 10% moisture when molded via hot pressing, depending upon the humidity in the region where such mats are stored and/or manufactured.

The reverse molded panels of the present invention are particularly suitable as wainscot panels. The panels are reverse molded to provide a "profile up" configuration. The reverse molding approach permits mounting the panel directly against a wall versus the prior art method requiring "shim spacers" (see FIG. 6A), thereby promoting easy installation while integrating excellent aesthetics of a wainscot panel. Historic treatments of real wood wainscot are well established and very expensive. Beyond the multiple piece millwork of real wood, some gypsum and polymeric materials have been fabricated into wainscot panels, but are marginally commercially acceptable, partly because they do not have the feel or look of natural wood. There are no wood fiber composite reverse molded wainscot systems available that provide the ease of application that is achieved in accordance with the principles of the present invention.

With respect to conventional doors, molded door skins may be adhesively secured to a wood frame support structure to produce a finished door. Rails and stiles may also be used to provide additional structural support for the door. Such doors are well known in the art, and provide consumers with an aesthetically appealing, yet cost efficient alternative to traditional, solid wood doors.

A consumer may desire to replace an existing flat or flush door with a door having a contoured exterior surface. For example, a consumer may completely replace a door having a planar surface with a door having contoured molded door skins. However, this requires that the existing door be completely replaced. Often, the existing doorframe, door hinges and lock mechanism must also be replaced or modified, given the new replacement door may have different dimensions from the existing door. Similarly, if a consumer wants to replace a cabinet door or paneling, the pre-existing cabinet door or paneling must be completely replaced. Again, the new molded door or paneling may not have the proper dimensions for simple replacement. As such, structural modifications must be made, or the entire existing article must be replaced. For example, the dimensions of kitchen cabinets may be such that replacement of only the cabinet door is not possible. Thus, the entire cabinet may need to be replaced. Such complete replacement is often expensive, and can be cost prohibitive for many consumers.

Various attempts to provide consumers with a cost efficient alternative to complete replacement of a planar door or other article have been made. In one such attempt, a molded plastic panel is provided, which is adhesively secured to a face of a conventional flat plywood door. Such plastic panels generally include an interior planar portion, surrounded by a contoured portion. The interior portion of the panel is secured to the door face. Often, a gap or parting line is created between the outer perimeter of the contoured portion and the door face, which is aesthetically unacceptable for many consumers.

In an attempt to minimize the gap between the panel and door face, a bead of caulk is often required to eliminate the gap. However, this may not present a satisfactory appearance. The caulk often dries and cracks over time, and therefore must be maintained and/or replaced periodically. In addition, the caulk may not match the color of the door face and/or panel. Furthermore, the caulk usually has a different texture and surface appearance compared to the plastic panel and the plywood door face. Therefore, even if the panel and door are painted, the surface appearance is often unsatisfactory for many consumers. Thus, such panels do not provide an acceptable alternative for many consumers.

Other attempts to provide an acceptable alternative to complete replacement provide for wood composite panels or skins that may be secured to a planar surface, such as a molded wood composite door skin or wainscot paneling. Although such wood composite articles provide some advantages over plastic molded panels, all of the above noted problems with plastic panels are not overcome. Specifically, the outer perimeter of molded wood composite panels may develop a gap or parting line with the contact surface. The wood composite article and/or the planar contact surface (such as a planar door face) may warp or sag over time, thereby creating a parting line. Adhesively securing such panels may provide an adequate adhering force for retaining the panel to the planar surface generally, but there is no tensioning force maintaining the outer perimeter of the panel to the planar surface. Thus, a parting line often develops.

Therefore, there is a need for a molded panel component that may be secured to an existing planar surface, which has an aesthetically acceptable appearance for consumers. There is also a need for a molded panel component that is tensioned to the planar surface, which maintains an adhering force tensioning the panel component to the planar surface.

SUMMARY OF THE INVENTION

The present invention is directed to a reverse molded fiberboard panel; a wainscot kit comprising a plurality of differently sized reverse molded panels, and a planar finishing or spacer panel, adapted to completely cover any size wall between a wall base board and a wall chair rail; and a method of reverse molding a loose cellulosic mat, in a single pressing step, to provide one or more relatively high density, raised panels without requiring preliminary pressing, or other pre-shaping step, such as scalping. The reverse-molded panels are molded in a conventional, multi-opening fiberboard press, in a single pressing step process, while achieving excellent transfer of mold detail (embossing fidelity) without visually noticeable fiber fracture. The panels can include a foil, an impregnated paper overlay, or thermoplastic coating materials but do not require an overlay or high resin content coating to achieve excellent embossing fidelity and appearance.

In one embodiment, the loose cellulosic mat that is molded is manufactured by the dry process to provide a smooth, planar back surface surrounding the back surface of the raised, molded panels, rather than a screen back pattern which results from pressed mats made by the wet process. The reverse molded raised panel design provides a raised profile (profile up) that is sharp and crisp with sharp detail in exterior corners that has the appearance and feel of hand crafted natural wood millwork, but actually is a reverse-molded, high density wood composite material that can be adhesively secured to a planar wall, such as gypsum wallboard.

Accordingly, one aspect of the present invention is to provide reverse molded, wood composite articles, and a method of manufacturing the articles, wherein the articles are molded from a loose mat of cellulosic fiber and binder, such that the articles have an upwardly raised panel that simulates natural wood millwork.

Another aspect of the present invention is to provide reverse molded, wood composite articles, and a method of manufacturing the articles, in kit form, such that the articles can be securely adhered to any planar surface, such as a gypsum wallboard, or plaster wall, to fill the entire wall area between a base board and a chair rail, while providing sharp, crisp exterior corners on the reverse molded, raised panel, to simulate natural wood, handcrafted millwork.

Another aspect of the present invention is to provide a wainscot kit comprising a plurality of reverse molded wood composite articles having different widths and a planar panel that can be easily cut to a desired width to fill an entire wall between a base board and a chair rail.

Still another aspect of the present invention is to provide a reverse molded wood composite article that provides exact transferring of mold detail at exterior corners and contours in a single pressing operation without requiring multiple press steps, post mold curing at elevated temperatures, or a foil or a high resin content (5-25%) outer surface portion.

Another aspect of the present invention is to provide reverse molded wood composite articles that can be molded from cellulosic mats that do not require synthetic fibers, scrim surfaces, layering of short and long fibers, resin-impregnated paper overlays, thermoplastic varnishes, or needling (needle punching) to hold the mat together prior to molding.

A further aspect of the present invention is to provide a reverse molded wood composite article that has one or more raised panels including a centrally disposed rectangular panel portion of 5-10 mm in height, surrounded by a raised, molded, contoured millwork design having a plurality of raised, planar steps ascending upwardly and inwardly integral with rounded contours to a rounded top portion that has increased density at a rounded apex, to prevent damage and surface fiber fractures, and has a geometry such that sharp, crisp surface detail is provided, particularly at exterior corners of the millwork geometry, in a single pressing (molding) step, while providing substantially uniform density in all but the rounded apex of the raised, molded rectangular millwork design.

Another aspect of the present invention is to provide a reverse molded wood composite article that can be molded in a strip of multiple parts in a single pressing (molding) operation and can be cut into separate parts after molding and then coated with a water-based and/or solvent-based coating material, e.g., paint or stain.

Still another aspect of the present invention is to provide a wainscot kit that includes a plurality of reverse molded wood composite articles to provide at least two differing raised panel (window) sizes, at least two different composite article widths, wherein a smaller width composite article has a proportionately smaller raised panel width, and a planar spacer panel, so that the combination of composite articles can completely fill a wall between a base board and a chair rail by cutting the planar spacer panel to size at inside wall corners for covering the full wall width up to the chair rail. More particularly, the preferred reverse molded articles in the kit are provided in widths of 12 inches, 16 inches and 48 inches with the 12 inch and 16 inch widths having windows (raised panels) of different sizes; and the 48 inch wide article having three windows of a size to match either the 12 inch wide or 16 inch wide article.

Another aspect of the present invention is to provide a reverse molded wood composite article that has one or more raised panels comprising a central, planar raised portion surrounded by a rectangular raised millwork design, the raised panels being, surrounded by planar stiles and rails wherein the raised panels are capable of being separated from the surrounding planar stiles and rails, e.g., via sawing or back sanding, from the surrounding planar base so that the separated panels can be adhered to a household door, cabinet door, shutters, furniture, library or millwork walls, or as a framing material by further removing the central planar raised panel portion.

In a second embodiment of the present invention, a reverse molded, plant-on decorative panel component is provided. The panel component includes a panel portion lying on a first plane, a skirt portion having a first surface adapted to be exteriorly disposed and an opposite second surface adapted to be interiorly disposed in order to be adhesively secured to a planar surface, and a contoured first portion extending outwardly from and surrounding the panel portion and interconnecting and integral with the panel portion and the skirt portion. The skirt portion extends peripherally about the contoured first portion, and may be angularly disposed relative to the first plane.

The present invention also relates to a reverse molded wood composite door skin. The door skin comprises at least one panel portion lying on a first plane, a skirt portion having a first surface adapted to be exteriorly disposed and an opposite second surface adapted to be interiorly disposed in order to be adhesively secured to a planar surface, and an outwardly extending contoured first portion surrounding the panel portion and interconnecting and integral with the panel portion and the skirt portion. The skirt portion extends peripherally about the panel portion, and may be disposed angularly relative to the first plane.

A method of decorating a planar surface of a door comprises the steps of: providing a door having a planar door face; providing a plant-on panel component, the panel component comprising a panel portion lying on a first plane, a skirt portion having a first surface adapted to be exteriorly disposed and an opposite second surface adapted to be interiorly disposed in order to be adhesively secured to the door face, and a contoured portion extending outwardly from and surrounding the panel portion and interconnecting and integral with the panel portion and the skirt portion, the skirt portion extending peripherally about the contoured portion and being disposed angularly relative to the first plane; and adhesively securing the plant-on decorative panel component to the planar door face so that the skirt portion is tensioned against the door face.

A method of decorating a wood composite door, comprising the steps of: providing a door having a planar door face; providing a reverse molded wood composite door skin having a first surface adapted to be exteriorly disposed and an opposite second surface adapted to be adhesively secured to the door face, the door skin having at least one panel portion lying on a first plane, a skirt portion, and a contoured portion extending outwardly from and surrounding the panel portion and interconnecting and integral with the panel portion and the skirt portion, the skirt portion extending peripherally about the contoured portion and being disposed angularly relative to the first plane; and adhesively securing the door skin to the door face so that the skirt portion is tensioned against the door face.

A kit for decorating a planar surface comprises at least a first reverse molded wood element. The element comprises at least one panel portion lying on a first plane, a skirt portion having a first surface adapted to be exteriorly disposed and an opposite second surface adapted to be interiorly disposed in order to be adhesively secured to a planar surface. An outwardly extending contoured first portion surrounds the panel portion and interconnects and is integral with the panel portion and the skirt portion. The skirt portion extends peripherally about the panel portion, and may be disposed angularly relative to the first plane.

A method of making a kit for decorating a planar surface comprises the following steps: providing a mold press having an upper mold die and a lower mold die, wherein the upper die has a planar zone, a contoured zone and angles zones, and the lower die has a planar zone, a contoured zone and angles zones complementary to the zones of the upper die, respectively; positioning a cellulosic mat between the upper and lower dies; and compressing the cellulosic mat between the upper and lower dies and heating the cellulosic mat to a temperature sufficient to form a door skin having at least one panel portion lying on a first plane, a skirt portion having a first surface adapted to be exteriorly disposed and an opposite second surface adapted to be interiorly disposed in order to be adhesively secured to a planar surface, and an outwardly extending contoured portion surrounding the panel portion and interconnecting and integral with the panel portion and the skirt portion, the skirt portion extending peripherally about the panel portion and being disposed angularly relative to the first plane.

BRIEF DESCRIPTION OF THE FIGURES

FIG. 1.0 is a cross-sectional view of the panel component of FIG. 8 viewed along line 9-9 in the direction of the arrows after the panel component has been adhered to a planar surface;

DETAILED DESCRIPTION OF THE INVENTION

The present invention is directed to a reverse molded (profile up, as molded) wood composite article particularly useful for the manufacture of a wainscot panel or door facing surface, and to a method of making the reverse molded wood composite article, having an upwardly inclined profile molded upwardly from a planar base portion of the article. The molded wood composite article of the present invention is preferably made from a cellulosic mat containing a combination of cellulosic fibers, including at least about 40% by weight, preferably at least about 60%, softwood fibers, (from trees that produce cones) such as all species of pine, and fir, e.g., Southern Pine, based on the total dry fiber weight, and a natural or synthetic binder, such as a phenol formaldehyde or urea formaldehyde resin. The cellulosic mat includes at least about 80% refined, fibrillated cellulosic fibers, e.g., a fiberboard mat, such as that hot-pressed to produce hardboard. The upper surface of the molded article has excellent molding die fidelity and may have a smooth finish or may be embossed to simulate a hardwood grain pattern, such as oak, simulating furniture grade natural wood. The articles are molded from a planar layer or mat of cellulosic fibers, e.g., a fiberboard mat, made either by the wet process or the dry process, preferably the dry process.

Preferably, the fiberboard mat is one to three inches in thickness before molding, and after molding is ⅛ to ¼ inch in thickness having co-planar stiles and rails, and planar back surfaces surrounding the molded panels, such that the co-planar back surfaces are adapted for flush contact against a wall or door surface, particularly between a wall base board and chair rail, as a wainscot outer wall surface lining for an interior household wall. The disclosed reverse molded panels may also be manufactured in a kit, including a plurality of differently sized panels adapted to completely line an interior wall, regardless of wall dimension.

Figure 2:
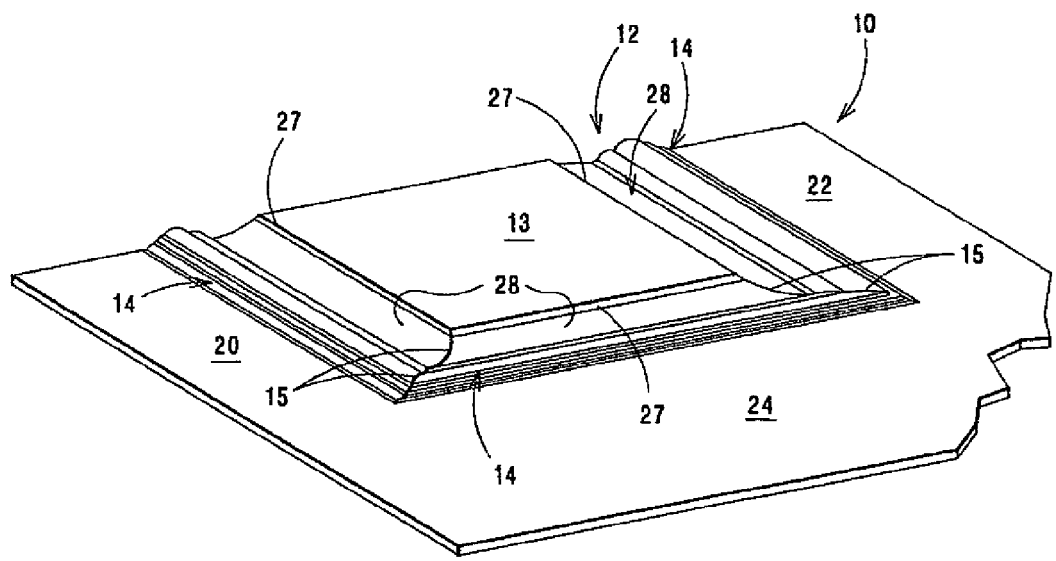
FIG. 2 is a fragmentary perspective view of the reverse molded wainscot article according to the present invention.

In a first embodiment of the present invention, molded wood composite articles are molded in the form of wainscot paneling to be adhered to a planar interior wall between a wall base board and a wall chair rail, to simulate solid, natural wood wainscot millwork, as shown in FIG. 2. It should be understood, however, that the principles of the present invention are applicable to other molded articles, such as exterior and interior doors or door skins, cabinet and furniture door facings, furniture components, garage door skins, decorative wall paneling, wardrobe door facings, decorative hardboard, and other such molded, wood composite articles having one or more reverse-molded raised millwork designs adjacent to a planar surface portion of the molded article.

The dimensions of the reverse molded composite articles of the first embodiment preferably varies from 5 inches to 96 inches in width and from 12 inches to 60 inches or even 96 inches in height. Preferably, the articles of the present invention are formed from at least 80% by weight fibrillated cellulosic fibers, based on the total, dry weight of fibers in the articles, and a binder capable of adhering the cellulosic fibers together into a structurally stable, consolidated article. The cellulosic fibers are in the form of refined, fibrillated fibers and can be molded and adhered together with natural or synthetic binders to provide aesthetically pleasing molded contours, and smooth or wood grain texture surfaces in all exterior, visible surfaces, including the molded, raised panel surfaces. The articles of the present invention can be molded as a thin, e.g., 0.1 to 0.3 inch wainscot, or raised panels can be cut or back sanded to remove the raised panels for adherence to a cabinet door or the like to provide a raised, hand-crafted, natural wood millwork look onto any planar surface. The reverse molded articles may then be adhesively applied or otherwise fastened to any planar support structure.

Figure 1:
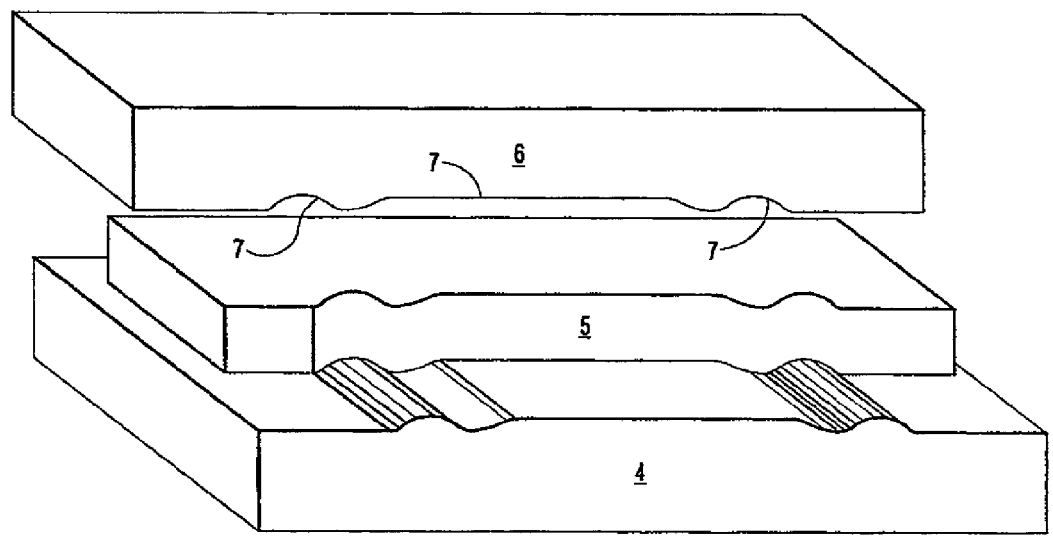
FIG. 1 is a perspective view of upper and lower mold dies according to a first embodiment of the present invention, and a wood fiber mat disposed therebetween.

Turning now to the drawings, and initially to FIG. 1, there is illustrated a perspective view of a mold set, including a lower mold half or mold cavity 4, having a partially broken-away cellulosic mat 5 laid thereover, and an upper mold core 6, for pressing the mat 5 into a wainscot panel, generally designated by reference numeral 10. The upper mold core 6 has a mold depression 7 in its undersurface that is shaped complementary to the upwardly extending mold design shown in lower mold cavity 4 for pressing the mat 5 therebetween to conform to a mold cavity between the mold halves 4 and 6. The wainscot panel 10 is reverse molded, as shown in FIGS. 1 and 2, between the raised panel simulating lower mold cavity 4, and the upper mold core 6, to provide raised panels 12 in the molded article 10, including centrally disposed, planar raised panel portions 13, and rectangular contoured wall portions, generally designated by reference numeral 14, including raised exterior corners 15 on the panel outer surfaces that correspond to contours essentially identical to raised contours of the lower mold cavity 4.

The reverse molded panel 10 can be secured, e.g., adhesively, or via fasteners, such as nails or screws, to a suitable planar surface, such as a wainscot wall area of an interior room. The lower mold cavity 4 is essentially the same in general contour as an upper surface of the wainscot panel 10, except that the lower mold cavity 4 would be slightly smaller horizontally, in the raised panel dimensions, to allow for the thickness of the molded cellulosic mat 5 that is molded to the upwardly extending raised panel design shown in FIG. 2. The upper mold core 6 carries a raised panel-receiving mold cavity 7 dimensioned complementary to the upper surface of the raised panel structure 12, and can be smoothly contoured or can include downwardly extending structure (not shown) to emboss simulated wood grain ticks that form a wood grain pattern.

Figure 4:
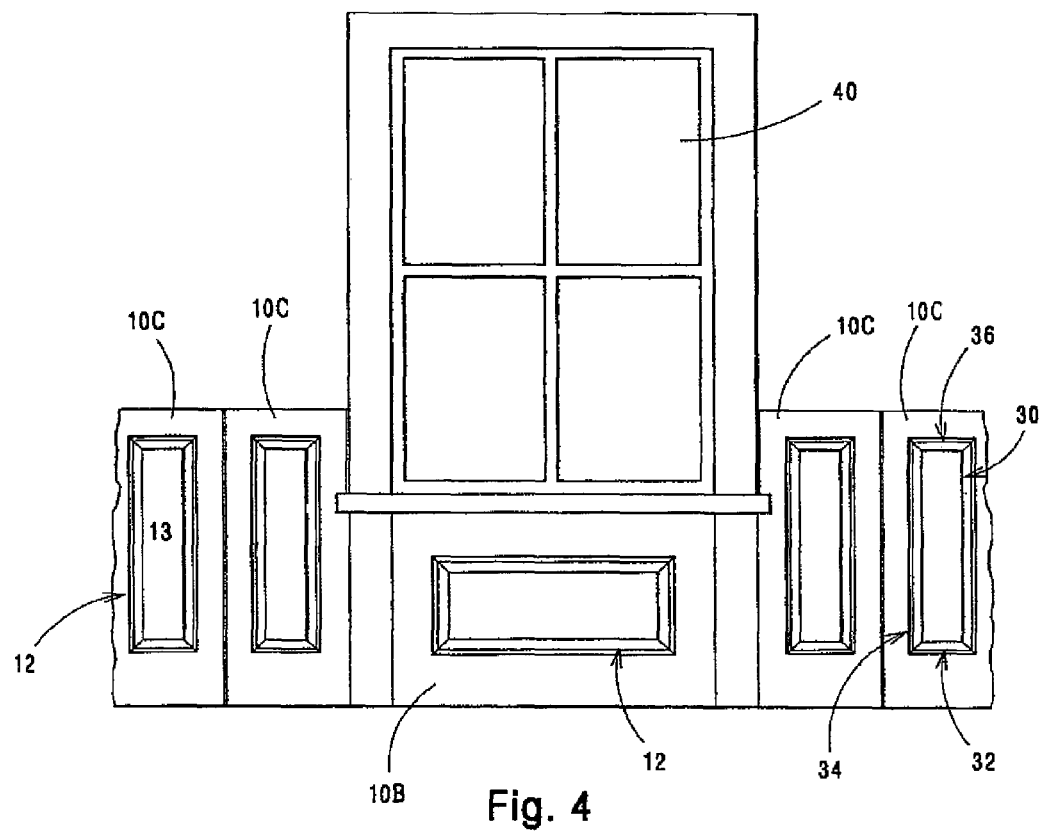
FIG. 4 is a fragmentary elevational view of a wainscot kit having reverse molded panels in one configuration around a window.
Figure 5:
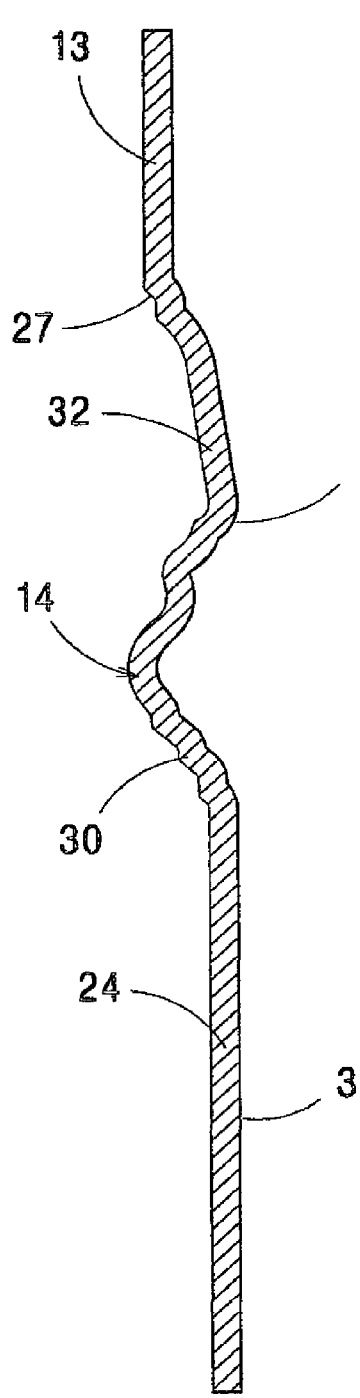
FIG. 5 is a fragmentary cross-sectional view of a reverse molded wainscot article showing the profile of the reverse-molded raised panel.
Figure 6A:
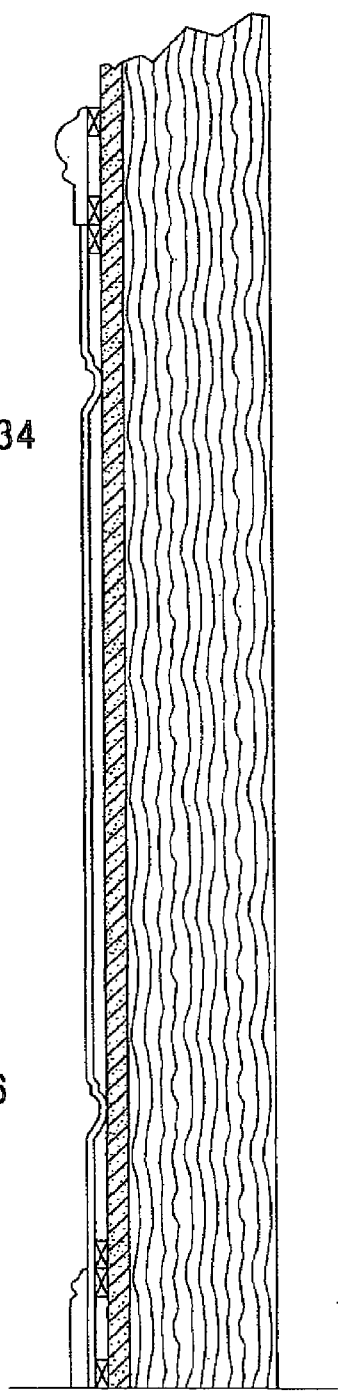
FIG. 6A is a cross-sectional view of a prior art wainscot article secured to a wall with shim spacers.
Figure 6:
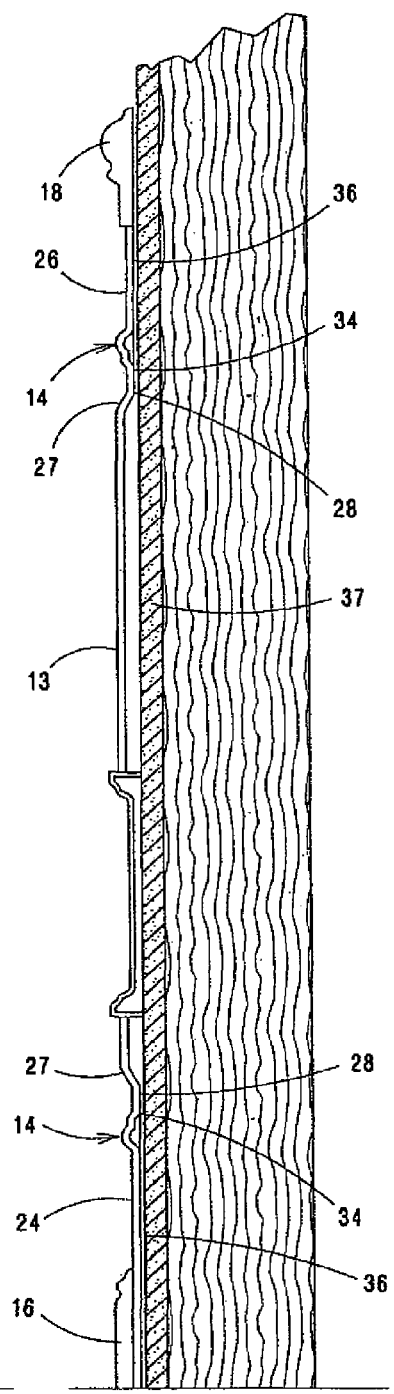
FIG. 6 is a cross-sectional view of the reverse molded wainscot article of FIG. 7 viewed along line 6-6 in the direction of the arrows.

The wainscot panel 10 is molded with the mold cavity, disposed between die halves 4 and 6, disposed in a generally horizontal disposition so that the upper major surface will be described as horizontal corresponding to its disposition during molding and it will be recognized that the position of the molded article, in use, is usually intended to be vertical, instead of horizontal, as in the case of wainscot panel 10, as shown in FIGS. 2-7. The "raised profile up" molded outer major surface of the wainscot panels 10 is disposed in a vertical orientation ("raised profile out") between a wall base board 16 and a wall chair rail 18, as shown in FIG. 6.

Wainscot panel 10, shown in FIG. 2, preferably includes one or more of the raised panels 12, which are molded to provide contoured walls 14 integral with and surrounding the centrally disposed planar raised panel portion 13. The contoured walls 14 are also integral with and surrounded by planar vertical stiles 20 and 22 and horizontal rails 24 and 26, respectively, lying in a common plane, for adhesive securement of an undersurface of each stile and rail 20, 22, 24 and 26 to a planar wall, as shown in FIGS. 3 and 6.

Figure 3:
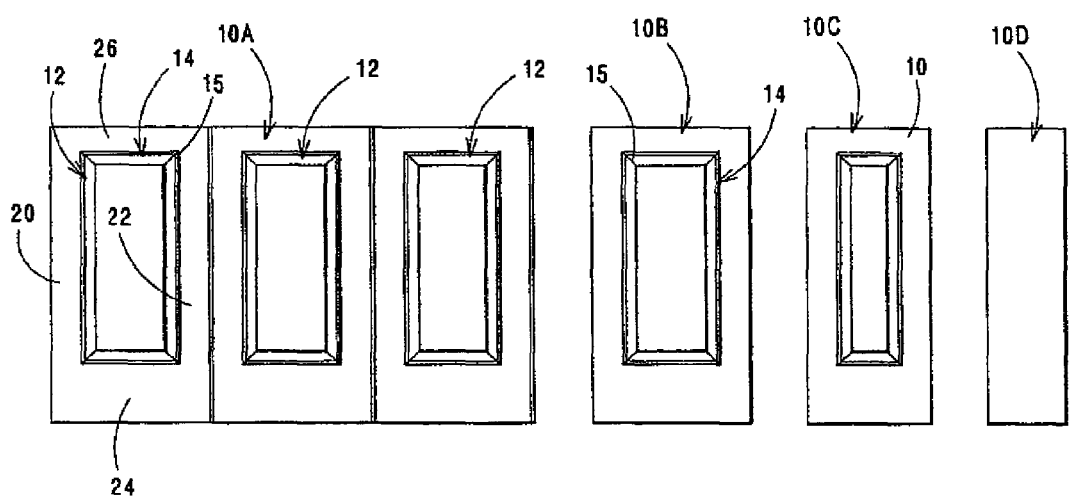
FIG. 3 is an elevational view of components of a wainscot kit including reverse molded panels.

In the preferred wainscot panel 10, best shown in FIGS. 2-4, the reverse molded contoured walls 14 are molded in a rectangular shape, surrounding the centrally disposed planar panel portion 13, and the contoured walls 14 are interconnected to outer edges 27 of the planar panel portion 13 through sloping walls 28, disposed therebetween. As best shown in the panel profiles of FIGS. 5 and 6, the contoured walls 14 include a wall portion 30 that is integral with and extends upwardly from an adjacent stile or rail (24, as shown in FIG. 5) at an angle of about 25° to about 35° above horizontal (as molded in the horizontal position). Wall portion 30 then is curved downwardly in a generally U-shaped contoured wall portion 32 integral at its outer end with wall portion 30, and integral at its inner end with the planar, raised panel portion 13, at outer edges 27 (FIGS. 2 and 5) of the planar, raised panel portion 13. Each of the four contoured walls 14 that form the reverse molded rectangles of each raised panel 12 are of identical contour. In accordance with the preferred embodiment, U-shaped contoured wall portion 32 is contoured such that an innermost undersurface 34 (as applied against a wall) of the contoured wall portion 32, at the base of the U, lies in the same plane as an undersurface 36 of the stiles and rails 20, 22, 24 and 26, so that the undersurface 34 of U-shaped wall portion 32, at the base of the U, contacts, and can be adhered to, wall 37 for structural support when in position (as shown in FIG. 6).

Preferably, the articles of the present invention are molded from a loose mat of cellulosic fibers and a thermosetting binder, such as a urea formaldehyde, melamine formaldehyde, and/or phenol formaldehyde binder commonly used in the manufacture of fiberboard. The mat should include at least about 80% fibrillated, refined cellulosic fibers, preferably 100%, based on the total, dry fiber weight in the mat 5. The fibers are mechanically refined from wood chips preferably using steam pressures in the range of about 80 to 120 psi, more preferably about 100 to 110 psi, most preferably about 105 psi. Steam pressures higher than about 120 psi in refining the cellulosic 20 fibers produce highly refined fibers that are useful in accordance with the present invention, but the cost of refining would be commercially prohibitive.

Such refining of cellulosic fibers will provide fibrillated cellulosic fibers that are preferably dry laid into a loose cellulosic fiber mat having a basis weight in the range of 0.58 to 0.62 pounds per cubic inch. Upon molding in a heated press at a temperature in the range of about 385° F. to 450° F., and at a maximum pressure in the range of about 550 to about 850 psi, the resulting embossed articles will have a specific gravity in the range of about 0.96 to about 1.08, preferably about 0.98 to about 1.06, more preferably about 1.00 to about 1.04. Articles of the present invention that are "profile up" compensate to increase density and surface toughness by reducing caliper at the highest point in the design profile to about 1.02 to about 1.08 specific gravity, with a target of 1.02 to 1.04 specific gravity, whether smooth or textured. The flat surface geometry surrounding the profile zones is pressed to a slightly lower specific gravity of 1.00 to 0.98 by slightly increasing the caliper within these zones.

The reverse molded panels 10 of the present invention can be produced in a plurality of widths, as shown in FIG. 3. For example, a molded panel 10A may be formed to have a width of 48 inches, with three raised panels 12. A panel 10B may be formed to have a width of 16 inches, with a single raised panel 12. A panel 10C may be formed to have a width of 12 inches, also with a single raised panel 12. A planar panel 10D may be formed having a width of 8 inches, which may then be easily cut lengthwise to complete a wall. Panels 10A, 10B, 10C and 10D are preferably the same height, for example 32 inches, which is a standard wainscot height. As shown in FIG. 4, panels 10A-10D may be arranged under and around a window 40. For example, panel 10B may be rotated 90° (relative to the panel illustrated in FIG. 3) so that the raised panel 12 has its length in a horizontal disposition. If a window is lower to the floor, panel 10C may also be used with either one or more planar panels 10D above and/or below panel 10C.

The wainscot kit shown in FIG. 3 may be easily installed by a homeowner by starting at the center of the room, or directly under a center window, and arranging the panels symmetrically toward inside corners of the spaced wall ends. By arranging the panels 10B and/or 10C properly, the 8 inch width planar panels 10D will be of sufficient width to fill all walls, to the wall ends, defined at inside room corners, and can be cut accurately to completely fill the wall.

Figure 7:
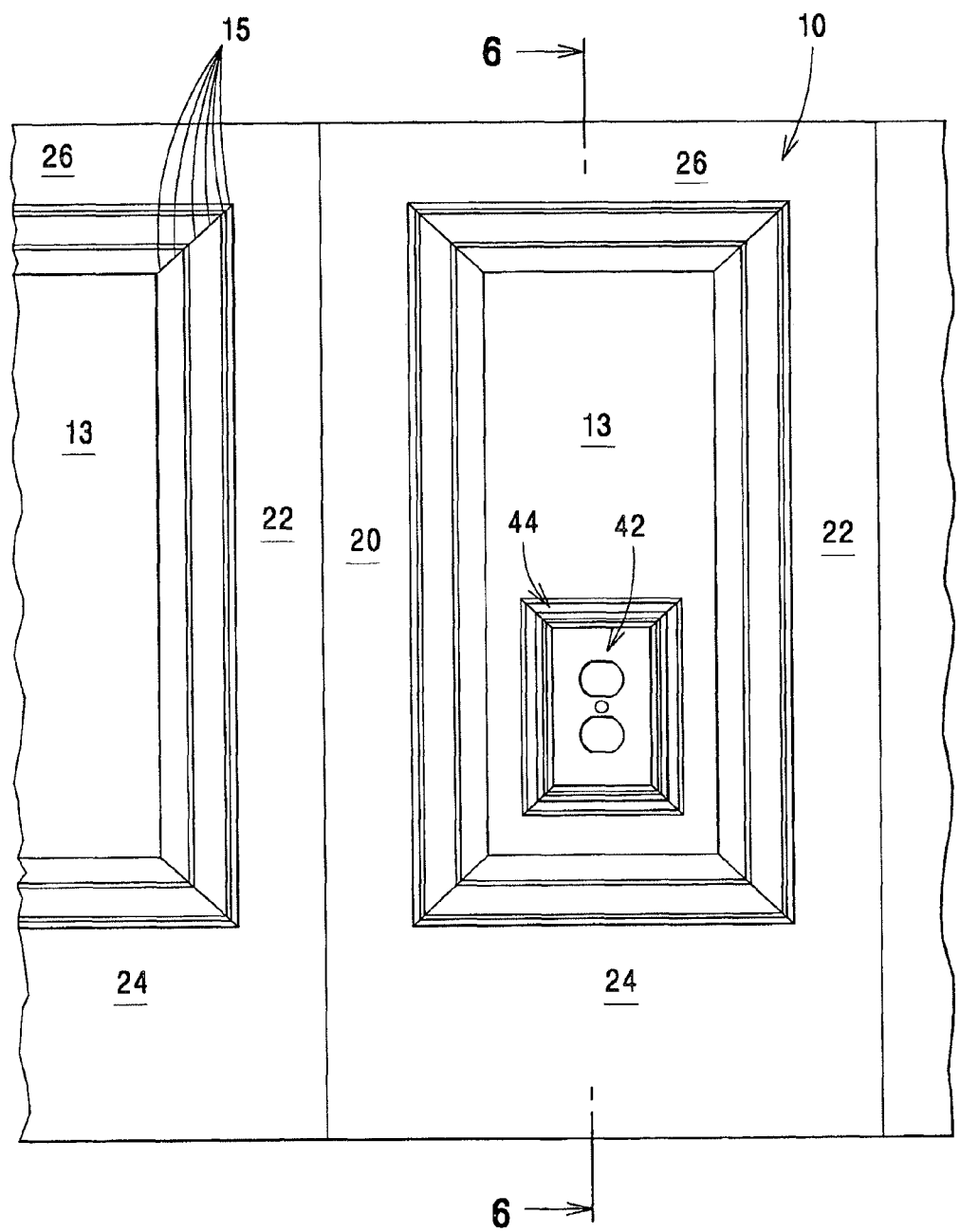
FIG. 7 is an elevational view of a wood composite wainscot article having a switch plate for securing to a wall through the wainscot article.

In accordance with another aspect of the present invention, electrical light switch plates (not shown) and outlet covers, generally and collectively referred to by reference numeral 42 (FIG. 7), may be provided with the kit of FIG. 3. These outlet covers 42 and switch plates (not shown) are rectangular and have outermost vertical walls 44 that are at least as high as the raised contoured walls 14 and planar raised panel portions 13 of panels 12 so that wherever the light switch plates and/or electrical outlet covers 42 are positioned within the wainscot panels 10, a hole may be cut in the panels 12 to the same outer dimensions as the switch plate cover or outlet cover 42, and the outlet cover 42 is inserted against the wall (within the panel), without exposing a cut panel, since the cuts in panel 12 will be flush against the outermost walls 44 of the outlet cover 42, as shown in FIG. 7.

Figure 8:
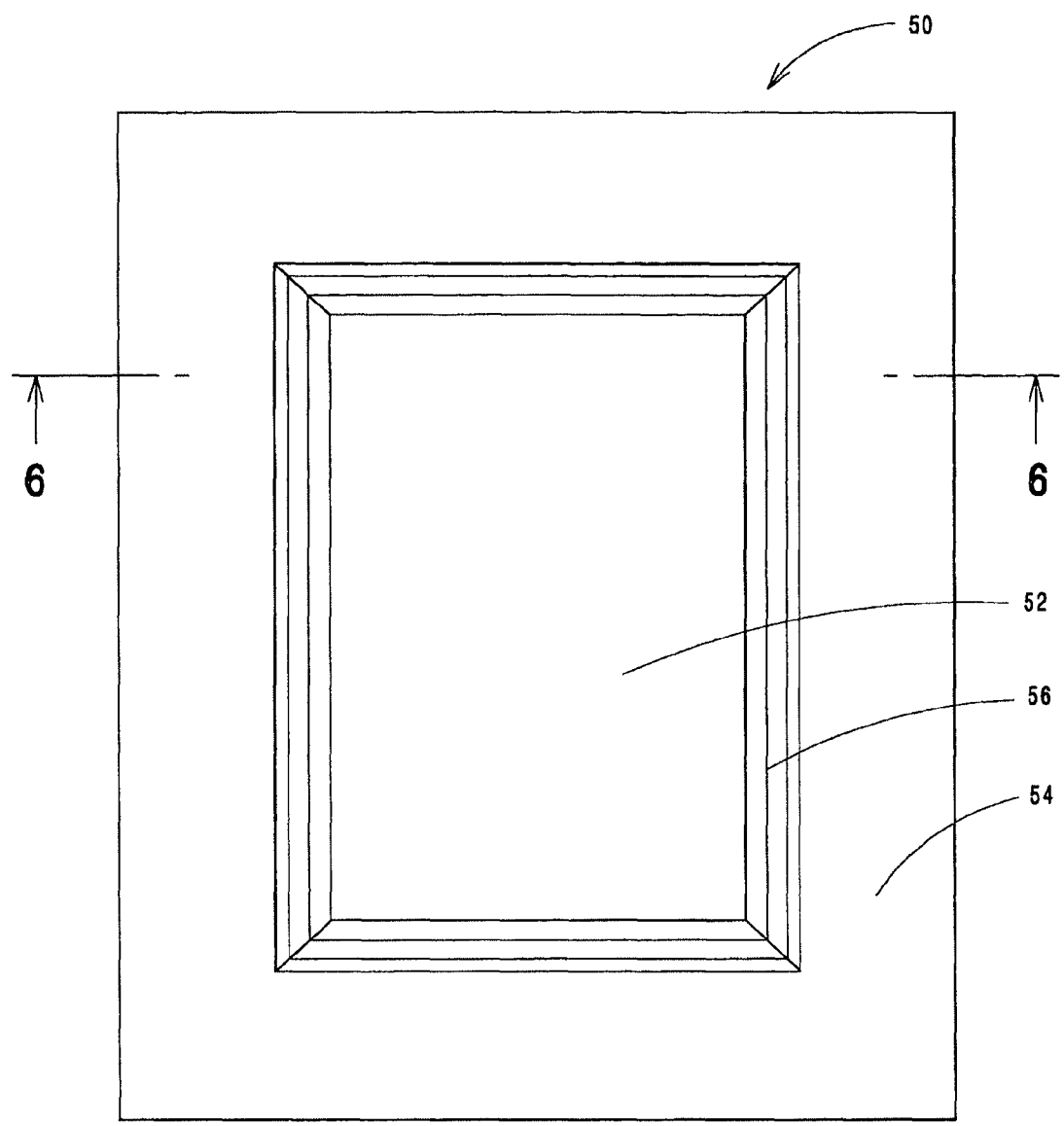
FIG. 8 is an elevational view of a plant-on decorative panel component according to a second embodiment of the present invention.

As best shown in FIG. 8, a second embodiment of the present invention provides a reverse molded, plant-on decorative panel component 50, which may be adhesively secured to a planar surface, and is tensioned to the planar surface when secured thereon. Plant-on panel component 50 comprises a panel portion 52 lying on a first plane, a skirt portion 54, and a contoured portion 56. Preferably, panel portion 52 is rectangular. However, it should be understood that panel portion 52 may be formed to have any shape, pursuant to consumer preference. Panel portion 52 lies on a plane that is coplanar with a plane extending between the uppermost parts of contoured portion 56. Contoured portion 56 extends outwardly from and surrounds panel portion 52 and interconnects and is integral with panel portion 52 and skirt portion 54. Skirt portion 54 extends peripherally about contoured portion 56.

Figure 9:
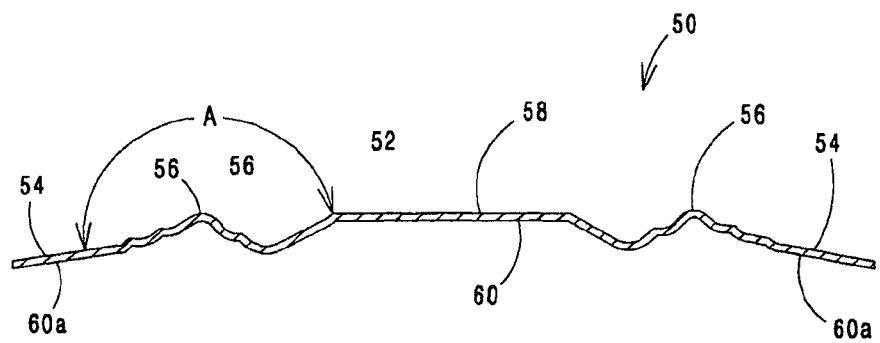
FIG. 9 is a cross-sectional view of the panel component of FIG. 8 viewed along line 9-9 in the direction of the arrows.

As best shown in FIG. 9, which shows a cross-sectional view of panel component 50 of FIG. 8 viewed along line 9-9 in the direction of the arrows, skirt portion 54 is disposed angularly relative to the plane of panel portion 52. Panel component 50 has a first surface 58 adapted to be exteriorly disposed and an opposite second surface 60. Interior surface 60a of skirt portion 54 is adapted to be adhesively secured to the planar surface of a door, wall, building side, or the like. Skirt portion 54 is angularly disposed inward, with respect to the plane of exterior surface 58 of panel portion 52. Preferably, skirt portion 54 is angled inwardly at least 5° from the plane of panel portion 52, as best shown in FIG. 9 by arrow A. Arrow A subtends an angle of 185° between the plane of panel portion 52 and skirt portion 54. However, it should be understood that skirt portion 54 may also be angled inwardly more than 5°, such as 10°, to provide additional tensioning force between skirt portion 54 and the planar surface to which panel component 50 is adhered. However, skirt portion 54 is preferably angled inwardly from the plane of panel portion 52 a maximum of 15°, because an angle of more than 15° may generate too much resistance for skirt portion 54 to conform to a planar surface (discussed in detail below). The tensioning force generated is also partially dependent on the caliper or thickness of the panel component. Preferably, the panel component has a finished caliper from between about 0.10 inches to about 0.25 inches.

Figure 10:
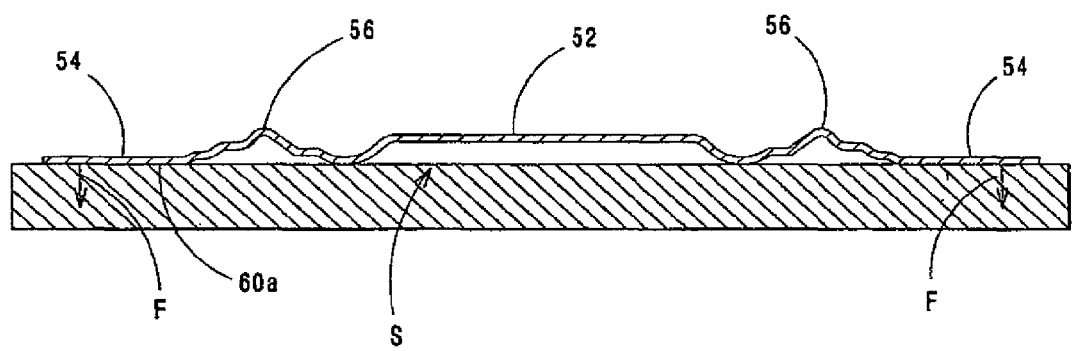

FIG. 10 is a cross-sectional view of panel component 50 of FIG. 8 viewed along line 9-9 in the direction of the arrows after panel component 50 has been adhered to a planar surface S. When panel component 50 is adhered to surface S, interior surface 60a of skirt portion 54 is secured flush to surface S with an adhesive, such as double sided adhesive tape, contact adhesive, hot-melt adhesive, and the like. Therefore, when skirt portion 54 is forced onto surface S and adhered thereto, the plane of skirt portion 54 is substantially parallel to the plane of panel portion 52. Contoured portion 56 flexes to allow skirt portion 54 to be so secured, thereby eliminating any perimeter gaps occurring from a nonflat surface S where skirt portion 54 meets surface S.

Contoured portion 56 is flexible enough to allow interior surface 60a of skirt portion 54 to be adhesively secured to surface S. When interior surface 60a is secured flush against planar surface S, the flexibility of contoured portion 56 and the angled disposition of unsecured skirt portion 54 generate a tensioning force F between skirt portion 54 and surface S, as shown by arrows F in FIG. 10. Similar to a spring, skirt portion 54 is pushed onto surface S. This spring-like force is generated due to the molded 5° angular configuration of skirt portion 54 when in the natural or unsecured state, as best shown in FIG. 9. Even if panel component 50 and/or surface S warps, tensioning force F will continue to push skirt portion 54 onto surface S, thereby eliminating any gaps or parting lines that may otherwise develop. This tensioning force F may or may not eliminate the angle of skirt portion 54, however any gaps are eliminated. Furthermore, it is not necessary to caulk around panel component 50, since gaps do not develop.

As noted above, skirt portion 54 is formed to have an angular configuration of at least 5°. The angle of skirt portion 54 relative to the plane of panel portion 52 should be formed so that a sufficient tensioning force F is generated. A preferred angle range is between about 5° to about 10° when the caliper of the panel component is between about 0.10 inches to about 0.25 inches. A sufficient tensioning force F maintains the spring-like adhering force that pushes skirt portion 54 into surface S. From a visual standpoint, the angle after adhering to surface S is insignificant. In addition, the angle of skirt portion 54 should not be so great such that an excessive tensioning force F is generated, which would cause the adhesive used to secure skirt portion 54 to pull free from surface S. We have found that a 5° angle configuration of skirt portion 54 provides an optimal tensioning force F, without pulling panel component 50 free from surface S. However, a greater angle may be formed depending on the strength of the adhesive used, and the nature of the surface S to which panel component 50 is adhered.

As in the first embodiment, panel component 50 is preferably molded from a wood composite material, such as a loose mat of cellulosic fiber and binder. Preferably the binder is present in an amount of about 3% to about 4% by weight if panel component 50 is treated with linseed oil, and about 6% to about 8% by weight resin when there is no linseed oil treatment. The binder is preferably a thermosetting binder, such as formaldehyde, melamine formaldehyde, phenol formaldehyde, urea formaldehyde, and methyl diisocyanate (MDI). Upon molding in a heated press at a temperature in the range of about 385° F. to 450° F., and at a maximum pressure in the range of about 550 to about 850 psi, molded panel component 50 will have a specific gravity in the range of about 0.80 to about 1.10, preferably about 0.98 to about 1.06, more preferably about 1.00 to about 1.04.

Figure 11:
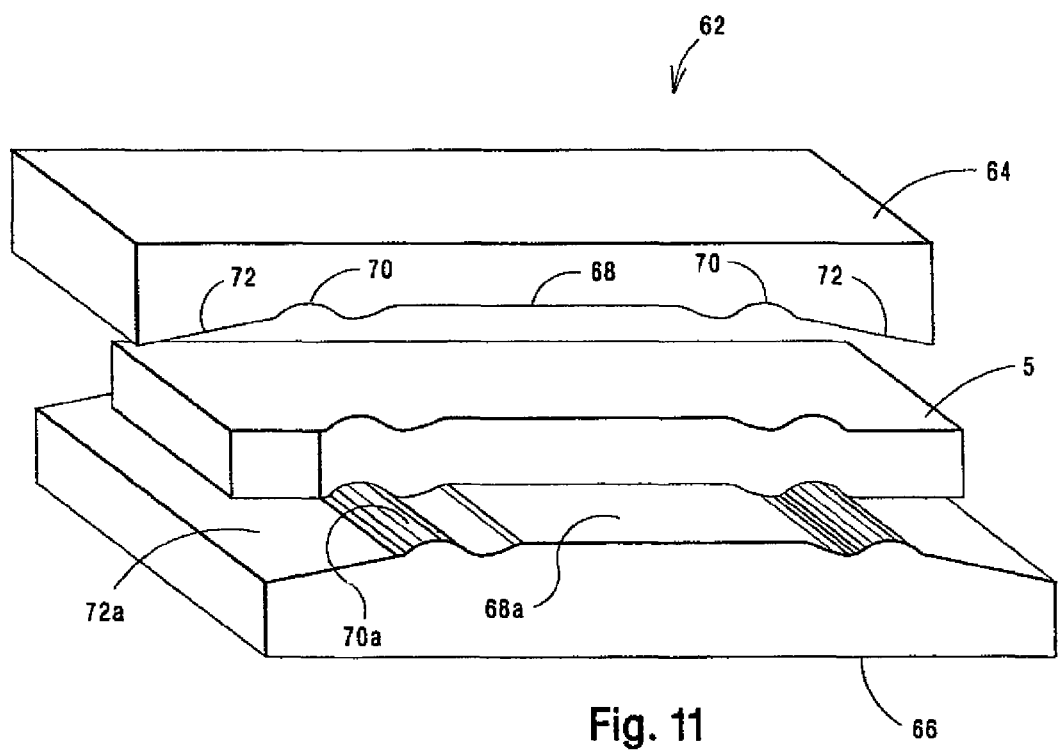
FIG. 11 is a perspective view of upper and lower mold dies according to the second embodiment, and a wood fiber mat disposed therebetween.

As best shown in FIG. 11, mold press 62 includes an upper mold die 64 and a lower mold die 66. Mold press 62 forms a reverse molded panel component 50, which has a "raised profile" that extends outwardly from panel portion 52 relative to exterior surface 58, as best shown in FIGS. 9-10. The reverse molding process permits mounting panel component 50 directly against a planar surface S without using shims or spacers, as best shown in FIG. 10. However, shims may be added as an option to support panel portion 52 to provide resistance to high impact against the panel. Mold press 62 may be a conventional, multi-opening fiberboard mold press. Upper die 64 includes a planar zone 68, which corresponds to panel portion 52, and contoured zones 70, which corresponds to contoured portion 56. Upper die 64 also includes angled zones 72, corresponding to the formation of skirt portion 54. Angled zones 72 extend downwardly from upper die 64, preferably at an angle of at least about 5° relative to planar zone 68. Lower die 66 has a configuration complementary to upper die 64, including a planar zone 68a, contoured zones 70a, and angled zones 72a.

Upper die 64 may also include a textured surface for embossing a pattern on exterior surface 58 of panel component 50, such as a wood grain pattern. Alternatively, a foil, impregnated paper overlay, or thermoplastic coating may be compressed onto exterior surface 58 during the compression process.

During the reverse molding process, upper and lower mold dies 64, 66 compress a wood fiber mat 5 into a desired configuration. As known in the art, the cellulosic fibers comprising mat 5 do not "flow" when compressed in mold press 62. Rather, the fibers are stretched, particularly at points corresponding to contoured zones 70, 70a. This stretching is maximized at points corresponding to exterior surface 58 of contoured portion 56 during compression, resulting in fracturing and fiber separation at such points due to the angle of force in reverse molding, as well as the downward force of gravity during compression. By contrast, interior surface 60 of contoured portion 56 maintains surface integrity because the effects of stretching are not as severe, and because the fibers are packed downward into the interior surface 60. Specifically, the length of exterior surface 58 of contoured portion 56 is greater than the corresponding length of interior surface 60 of contoured portion 56. As such, exterior surface 58 undergoes a greater amount of stretching as compared to interior surface 60, particularly with respect to contoured portion 56. Thus, the cellulosic fibers of mat 5 are stretched a greater distance on exterior surface 58, which often results in fracturing of exterior surface 58 when conventional molding methods are implemented.

Fracturing and fiber separation may be eliminated by adjusting caliper at points where stretching is maximized (i.e. exterior surface 58 of contoured portion 56). During reverse molding, upper and lower mold dies 64, 66 stretch and fracture the cellulosic fibers in cellulosic mat 5 at points corresponding to exterior surface 58 of contoured zones 70, which is the intended visible surface. In order to mend and eliminate the fractured areas on exterior surface 58, outwardly extending contoured portion 56 is "pinched" in order to reduce caliper and achieve a desired density. The reduced caliper creates a zone of overcompression of the outwardly extending contoured portion 56, which re-mends any fractures on exterior surface 58. In addition, the reduced caliper prevents blistering, and achieves a hardened surface that is able to handle additional abuse on or around the protruding, outwardly extending contoured portion 56.

Thus, the stretching of cellulosic fibers during the compression of mat 5 is most prevalent on exterior surface 58 of contoured portion 56, which has a higher "length ratio". The length ratio is the ratio of an exterior surface portion versus the corresponding interior surface portion. Cellulosic fibers are stretched and pulled as the length ratio increases, which results in decreased density and possibly surface fracturing if caliper is not adjusted. It has been determined that an increase in length ratio of between 15 and 75% is correlated to a decrease in caliper by 12 to 28%. Thus, caliper adjustment of contoured portion 56 is made as a means to effectively harden the surface at contoured portion 56, thereby achieving excellent surface hardness and paintability. Generally, caliper is reduced at the highest point in the design profile to about 1.02 to about 1.08 specific gravity, with a target of 1.02 to 1.04 specific gravity, whether smooth or textured. The flat surface geometry surrounding contoured portion 56 (i.e. panel portion 52 and skirt portion 54) is pressed to a slightly lower specific gravity of 1.00 to 0.98 by slightly increasing the caliper within these zones. Caliper adjustment for reverse molded panels is more fully explained in WO 01/81055 to applicant Masonite Corporation, titled Reverse Molded Panel, the disclosure of which is incorporated herein by reference.

Skirt portions 54 are formed by angled zones 72, 72a. The configuration of upper and lower dies 64, 66 therefore provide for the angled configuration of skirt portions 54, which is important for generating tensioning force F, as noted above. Therefore, mold dies 64, 66 are preferably configured to have angled zones 72, 72a extending outwardly and inwardly, respectively, from planar zones 68, 68a.

Panel component 50 may be formed in various sizes, as desired by the consumer. For example, panel component 50 may vary from 5 inches to 96 inches in width, and from 12 inches to 60 inches in height. In addition, panel portion 52 and skirt portion 54 may be formed to have various dimensions. Preferably, skirt portion 54 is formed to have an interior surface 60a with sufficient surface area for securely adhering to surface S. Preferably, skirt portion 54 extends outwardly from contoured portion 56 from between about 0.250 inches and about 0.375 inches. However, when panel component 50 is formed, skirt portion 54 extends from contoured portion 56 (i.e. the width of skirt portion 54) much more than this preferred range. For example, skirt portion 54 may be formed to have a width at least equal to the width of contoured portion 56, as best shown in FIGS. 8-10. Then, skirt portion 54 may be trimmed if necessary, in order for panel component 50 to be easily modified by the consumer and/or retail stores to fit a variety of planar surfaces S. Therefore, it should be understood that skirt portion 54 may be any desired width, so long as sufficient surface area on interior surface 60a of skirt portion 54 is retained for adhesively securing to surface S. Therefore, skirt portion 54 may be trimmed to have a width corresponding to the width of a conventional bead of mastic, or adhesive tape. Preferably, the width of skirt portion 54 is 0.5 inches or less. A skirt portion 54 that is greater than 0.5 inches in width may have an adverse affect on visual appearance of the panel component. Contoured portion 56 may also be formed in any desired configuration, so long as interior surface 60 of contoured portion 56 does not extend below the plane of interior surface 60a of skirt portion 54.

Figures 12, 13:
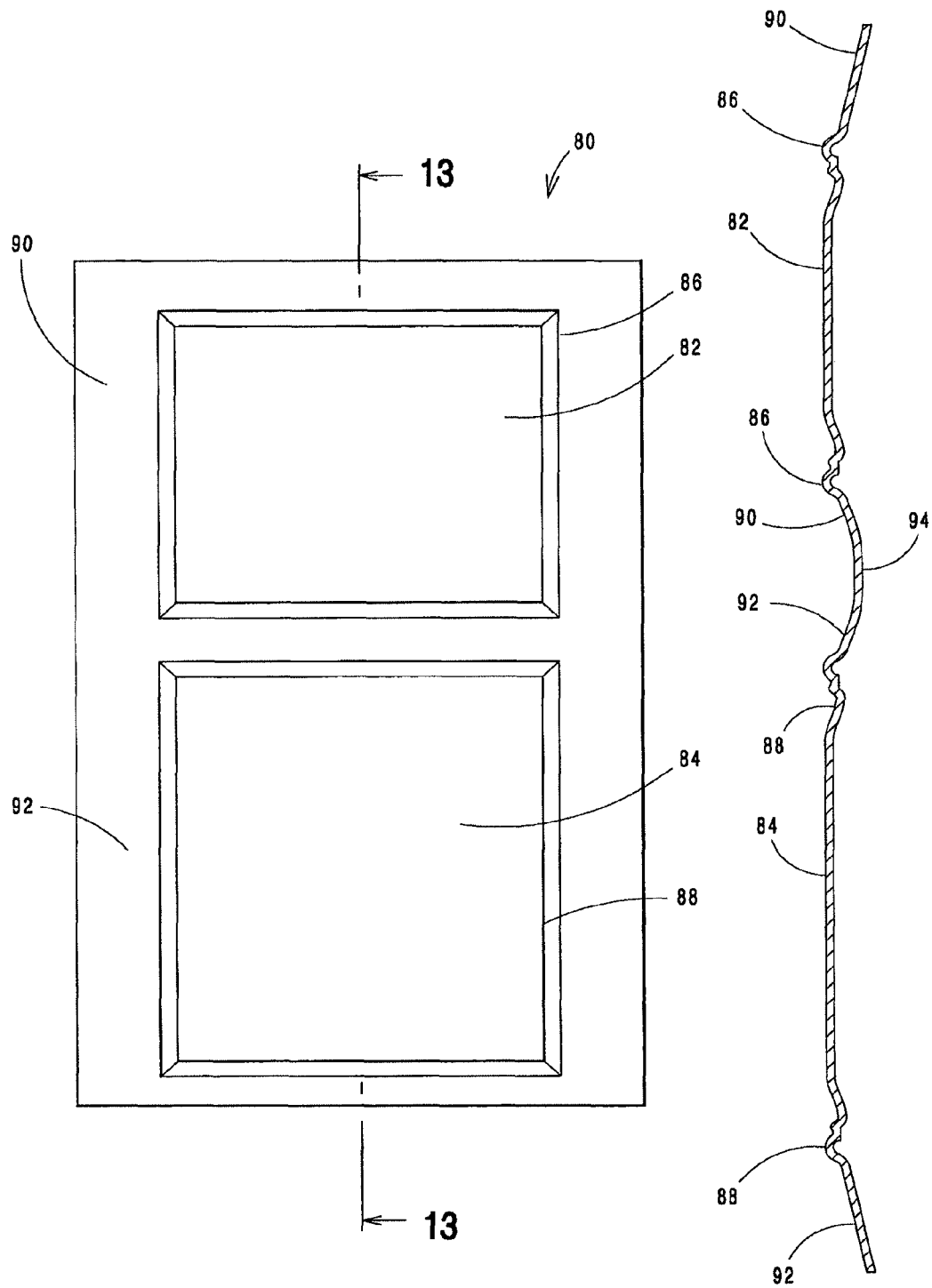
FIG. 12 is an elevational view of a molded door skin component according to the present invention.
FIG. 13 is a cross-sectional view of the door skin component of FIG. 12 viewed along line 13-13 in the direction of the arrows.

In a third embodiment of the present invention, a reverse molded door skin component 80 is provided, as best shown in FIG. 12. Preferably, door skin component 80 is formed from a wood composite material, as described above for panel component 50. Door skin component 80 is similar to panel component 50. Door skin component 80 may include more than one panel portion, such as panel 82, 84, as shown in FIG. 12. Each panel portion 82, 84 is surrounded by contoured portions 86, 88, respectively. Panel portions 82, 84 may be any desired size and shape, and may have identical or differing dimensions.

Skirt portions 90, 92 surround contoured portions 86, 88, as described above for panel component 50, as best shown in FIG. 13. FIG. 13 is a cross-sectional view of door skin component 80 of FIG. 12 viewed along line 13-13 in the direction of the arrows. Note that an intermediate zone 94 is formed between and separating skirt portions 90 and 92. Intermediate zone 94 is parallel to panel portions 82, 84. Intermediate zone 94 extends between skirt portions 90, 92, but has a relatively small width, for example 0.187 inches or less. Preferably, skirt portions 90, 92 each have a width of between about 0.250 inches to about 0.375 inches. Skirt portions 90, 92 of door skin component 80 may be trimmed to size along the perimeter of door skin component 80, especially if the door surface on which door skin component 80 is to be adhered is narrower in width than a standard size door. Because intermediate zone has a width of only 0.187 inches, this flat transitional zone is visually insignificant when door skin component 80 is adhered to the door surface given the slight 0.187 inches joining skirt portions 90, 92.

Alternatively, door skin component 80 may be cut at intermediate zone 94, forming two separate panel components. If cut at intermediate zone 94, the slight 0.187 width of intermediate zone 94 again does not impact the visual appearance. Note that although door skin component 80 is shown in FIGS. 12-13 to have two panel portions 82, 84, it is understood that any number of panel portions may be formed in door skin component 80 (with intermediate zones separating adjacent skirt portions), thereby forming various designs and configurations for consumers.

Figure 14:
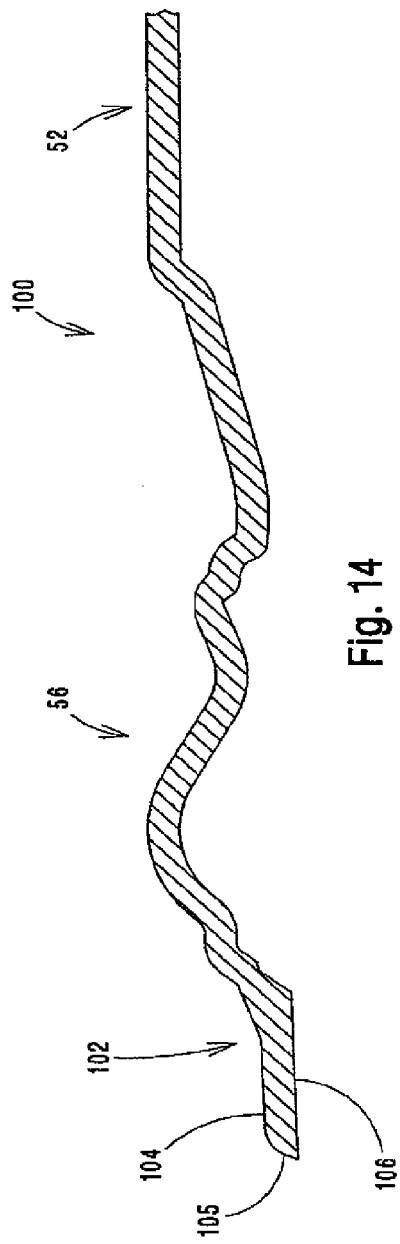
FIG. 14 is a fragmentary cross-sectional view of a panel component according to another embodiment.
Figure 15:
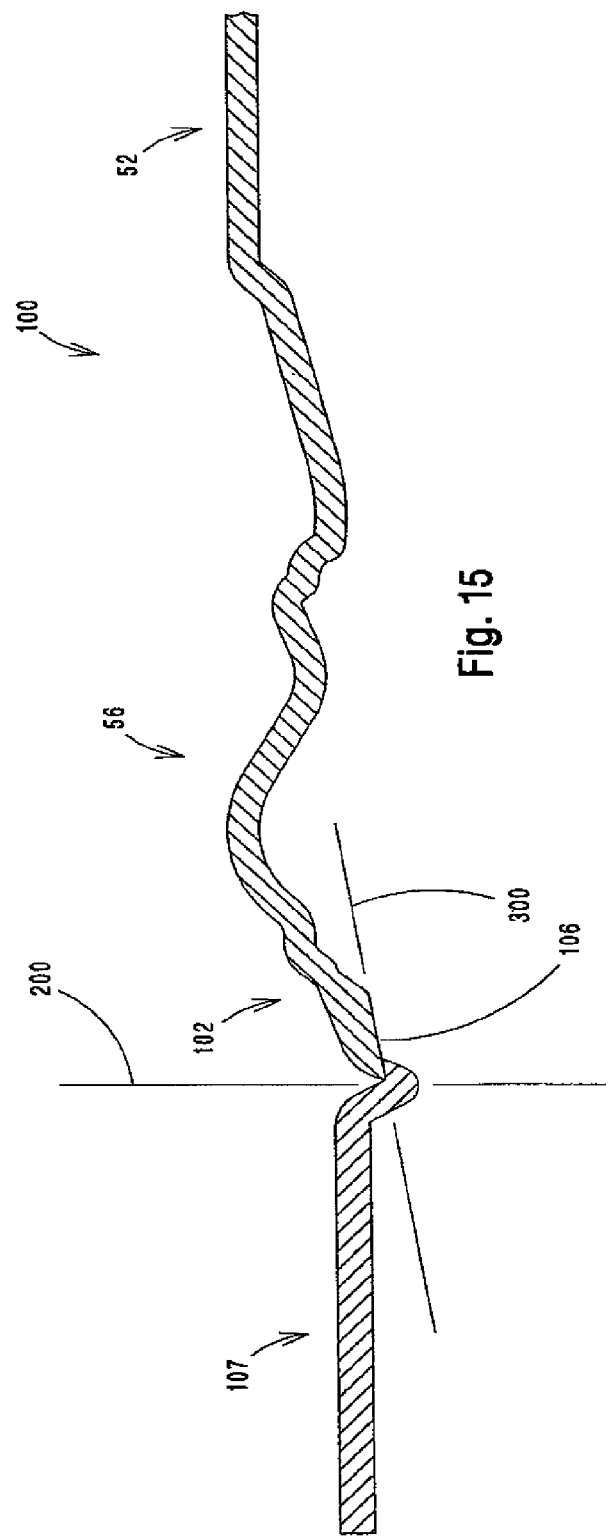
FIG. 15 is a fragmentary cross-sectional view of the panel component of FIG. 14 prior to trimming and cutting the skirt portion of the panel component.

In a fourth embodiment of the present invention, a panel component 100 is provided having skirt portion 102 with a contoured exterior surface 104 and a planar interior surface 106, as best shown in FIG. 14. FIG. 14 is a fragmentary cross-sectional view of a panel component according to the fourth embodiment. In addition to trimming the length of skirt portion 102, interior surface 106 of skirt portion 102 is sanded or machined to provide a planar surface for adhering to surface S. FIG. 15 is a fragmentary cross-sectional view of panel component 100 of FIG. 14 prior to trimming and sanding an excess portion 107 from skirt portion 102. Unfinished skirt portion 102 is trimmed to cut line 200, so that skirt portion 102 terminates in a rounded, radiused or arcuate end 105 at its perimeter, and excess portion 107 is separated. Interior surface 106 is then sanded or trimmed along sand line 300, so that interior surface 106 is planar, as shown in FIG. 14. Alternatively, the sanding of interior surface 106 may be sufficient to separate skirt portion 102 from excess 107 at cut-line 200. Planar interior surface 106 provides sufficient surface area for securing panel component 100 to surface S. As noted above, the width of interior surface 106 of skirt portion 102 is preferably between about 0.250 inches to about 0.375 inches after separating excess portion 107 therefrom. Furthermore, interior surface 106 is sanded or machined to have an angular configuration relative to panel portion 102, as best shown in FIGS. 14 and 15, to provide tensioning force as described above. Preferably, interior surface 106 is angled at from between about 5° to about 10°, similar to the other embodiments.

It should be understood that the contoured portion may be formed to have any configuration, pursuant to consumer preference, so long as it does not extend below interior surface 60a (or 106) of skirt portion 54 (or 102). Therefore, contoured portions 56 is only an exemplary configuration of the contoured portion for purposes of explanation. Preferably, the interior surface 60 of contoured portion 56 has a portion that is coplanar with skirt portion 54 (or 102) when the panel component is secured to surface S, as best shown in FIG. 10.

A method of decorating a planar surface S includes the steps of providing a planar surface S; providing a plant-on panel component 50, as described above; and adhesively securing the plant-on decorative panel component 50 so that the interior surface 60a of the skirt portion 54 is flush with the planar surface 8, thereby generating a tensioning force F between the skirt portion 54 and the planar surface S. It should be understood that the plant-on panel component 50 may be adhesively secured to any planar surface S, such as a door face, wainscot, a furniture or cabinet door, a wall, or the like. Additionally, panel component 50 may be trimmed and/or sanded (depending on the particular embodiment) as desired prior to securing same onto surface S. A planar surface S such as a door face may be decorated with a door skin component 80, as described above, in a like manner.

Figure 16:
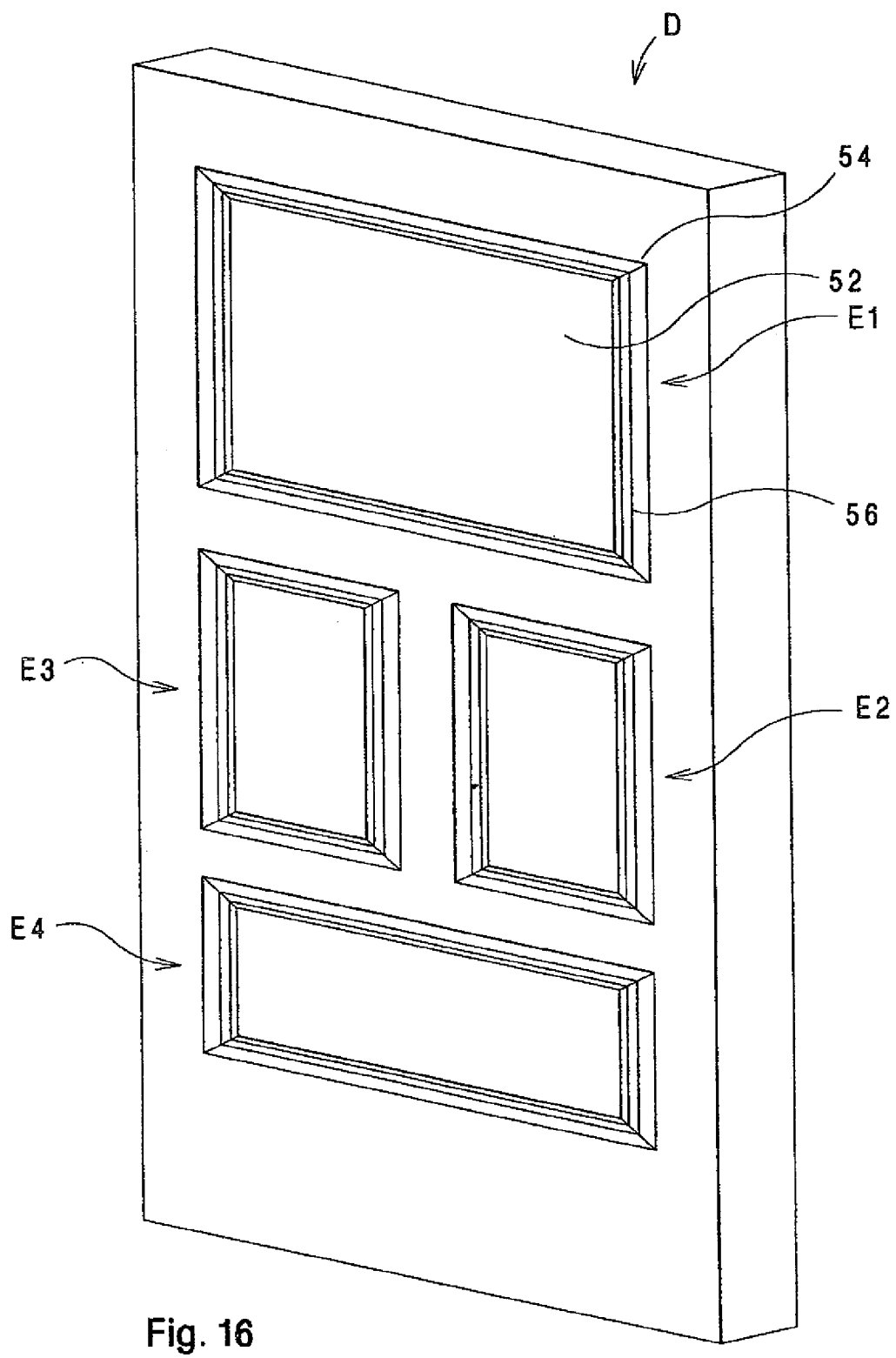
FIG. 16 is a perspective view of a door with plant-on elements from a kit secured thereto.

The present invention is also directed to a kit for decorating a planar surface, such as a planar door face D, a wall, or the like. The kit comprises at least a first reverse molded wood element E1, but may include a plurality of reverse molded wood elements, E1, E2, E3 and E4, as best shown in FIG. 16. Each one of elements E1-E4 comprises panel portion 52 lying on a first plane, skirt portion 54, and contoured portion 56, as described above.

Although the kit is described as having four elements E1-E4, it should be understood that the kit may include any number of elements, as desired by the consumer. Furthermore, each of the elements may have either the sane shape and size dimensions, or the elements of the kit may differ in size and shape in order to decorate a door, as best shown in FIG. 16. Furthermore, the elements need not be rectangular, but may be any desired shape, as explained above with respect to plant-on panel component 50.

The kit may also include adhesive, such as double sided adhesive tape, for securing each element E1-E4 to the planar surface (shown as door face D in FIG. 16). Thus, the consumer may purchase the kit, and secure the elements E1-E4 to a planar surface to create various panel configurations. Note that skirt portions 54 of each of elements E1-E4 may also be trimmed to an appropriate size, as explained above.

It will be apparent to one of ordinary skill in the art that various modifications and variations can be made in construction and configuration of the present invention, without departing from the scope or spirit of the invention. It is intended that the present invention cover all modifications and variations of the invention, provided they come within the scope of the following claims and their equivalents.

We claim as follows:

1. A reverse molded wood composite door skin, comprising:
a panel portion lying on a first plane;
a style and rail portion having a first surface adapted to be exteriorly disposed and an opposite second surface adapted to be interiorly disposed in order to be adhesively secured to a planar surface; and
a contoured wall extending integral with and surrounding the panel portion, and the style and rail portion extending integral with and surround the contoured portion.

2. The door skin of claim 1, wherein the contoured wall is molded in a rectangular shape surrounding the planar portion.

3. The door skin of claim 1, wherein the contoured wall portion includes a wall portion that is integral with and extends upwardly from the adjacent stile or rail portion at an angle of about 25° to about 35° above the horizontal.

4. The door skin of claim 3, wherein the contoured wall portion further includes a U-shaped wall portion having its outer end integral with the wall portion and its inner end integral with the planar portion.

5. The door skin of claim 4, wherein the U-shaped wall portion contains an inner surface at the base of the U which lies in the same plane as the second surface of the stiles and rail portion.

6. The door skin of claim 1, wherein style and rail portion lies in a second plane.

7. The door skin of claim 6, wherein the first plane and the second plane are approximately parallel.

8. The door skin of claim 6, wherein the second plane is disposed at an angle of between about five degrees to about fifteen degrees relative to the first plane.

9. The door skin of claim 1, wherein the panel portion has a first caliper and the contoured wall has a second caliper, said second caliper being less than said first caliper.

10. The door skin of claim 1, wherein said panel portion is rectangular.

11. A method for molding a reverse molded wood composite door skin, comprising the steps of:
   a. providing a mold press having an upper mold die and a lower mold die, wherein the upper die has a planar zone, a contoured zone, and style and rail zone, and the lower die has a planar zone, a contoured zone, and a style and rail portion complementary to the zones of the upper die, respectively;
   b. positioning a cellulosic mat between the upper and lower dies; and
   c. compressing the cellulosic mat between the upper and lower dies and heating the cellulosic mat to a temperature sufficient to form the door skin having
      i. a panel portion lying on a first plane;
      ii. a style and rail portion having a first surface adapted to be exteriorly disposed and an opposite second surface adapted to be interiorly disposed in order to be adhesively secured to a planar surface; and
      iii. a contoured wall extending integral with and surrounding the panel portion, and the style and rail portion extending integral with and surround the contoured portion.

12. The method of claim 11, wherein the cellulosic mat comprises cellulosic fibers and a thermosetting binder.

13. The method of claim 12, wherein the thermosetting binder is urea formaldehyde, melamine formaldehyde, and/or phenol formaldehyde.

14. The method of claim 11, cellulosic mat comprises at least about 80% fibrillated, refined cellulosic fibers (based on total, dry fiber weight).

15. The method of claim 11, wherein the contoured wall is molded in a rectangular shape surrounding the planar portion.

16. The method of claim 11, wherein the contoured wall portion includes a wall portion that is integral with and extends upwardly from the adjacent stile or rail portion at an angle of about 25° to about 35° above the horizontal.

17. The method of claim 16, wherein the contoured wall portion further includes a U-shaped wall portion having its outer end integral with the wall portion and its inner end integral with the planar portion.

18. The method of claim 17, wherein the U-shaped wall portion contains an inner surface at the base of the U which lies in the same plane as the second surface of the stiles and rail portion.

19. The method of claim 11, wherein style and rail portion lies in a second plane.

20. The method of claim 11, wherein the panel portion has a first caliper and the contoured wall has a second caliper, said second caliper being less than said first caliper.

* * * * *